Figure 1:
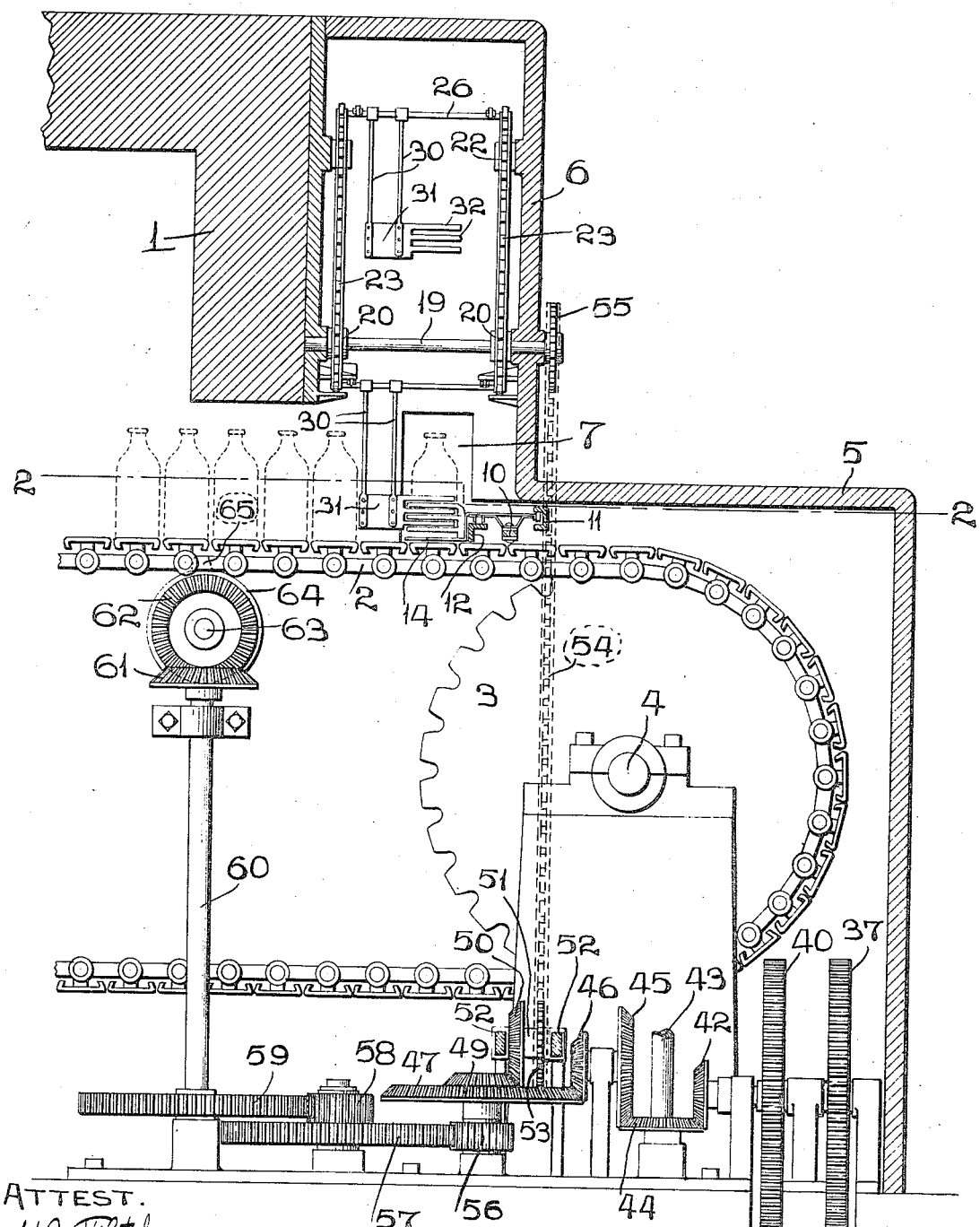

No. 861,383. PATENTED JULY 30, 1907.
T. C. MOORSHEAD.
BOTTLE CARRYING AND DISTRIBUTING APPARATUS FOR GLASS HOUSE LEERS.
APPLICATION FILED DEC. 4, 1906.

4 SHEETS—SHEET 1.

ATTEST.
H. J. Fletcher.
M. P. Smith

INVENTOR
THOMAS C. MOORSHEAD.
BY Higdon & Longan
ATT'YS.

No. 861,383. PATENTED JULY 30, 1907.
T. C. MOORSHEAD.
BOTTLE CARRYING AND DISTRIBUTING APPARATUS FOR GLASS HOUSE LEERS.
APPLICATION FILED DEC. 4, 1906.
4 SHEETS—SHEET 2.
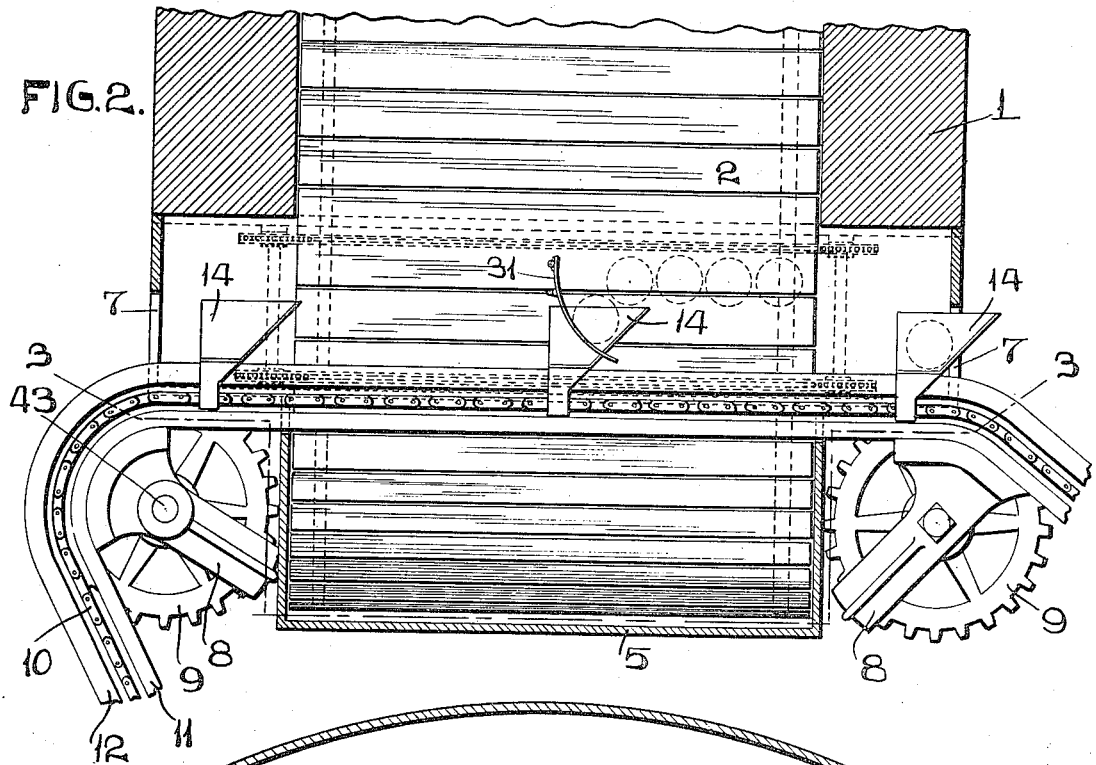
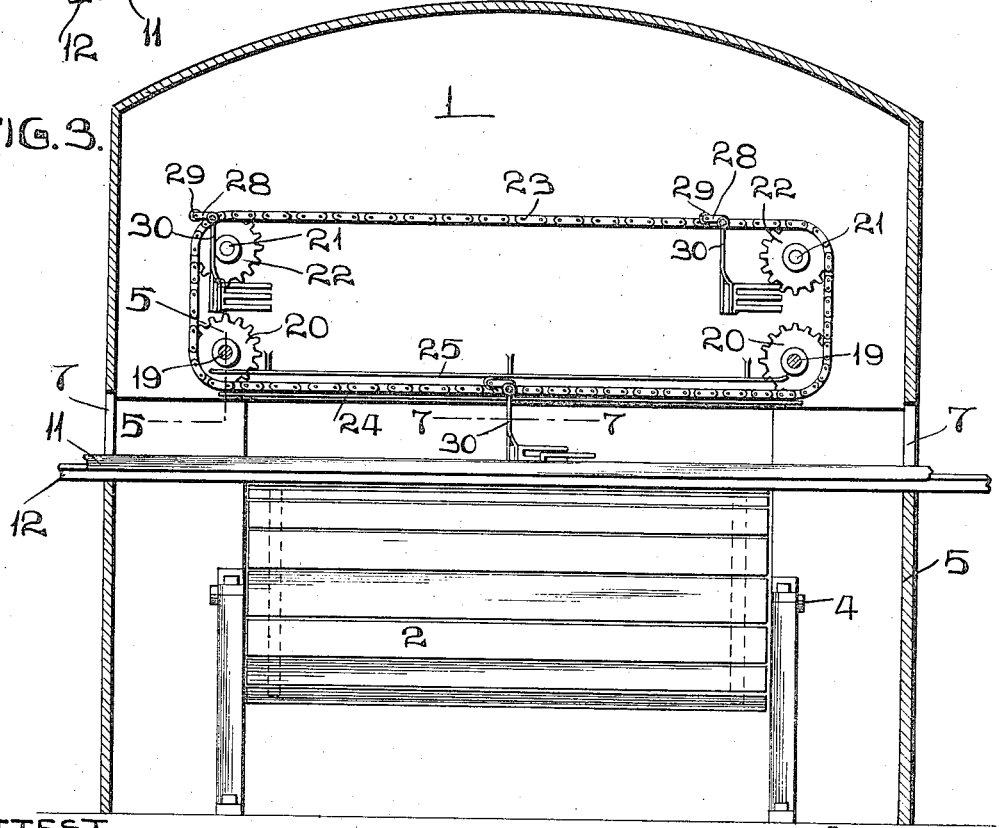
ATTEST.
H. O. Fletcher
M. P. Smith
INVENTOR.
THOMAS C. MOORSHEAD.
BY Higdon & Longan
ATTY'S.

No. 861,383. PATENTED JULY 30, 1907.
T. C. MOORSHEAD.
BOTTLE CARRYING AND DISTRIBUTING APPARATUS FOR GLASS HOUSE LEERS.
APPLICATION FILED DEC. 4, 1906.
4 SHEETS—SHEET 3.
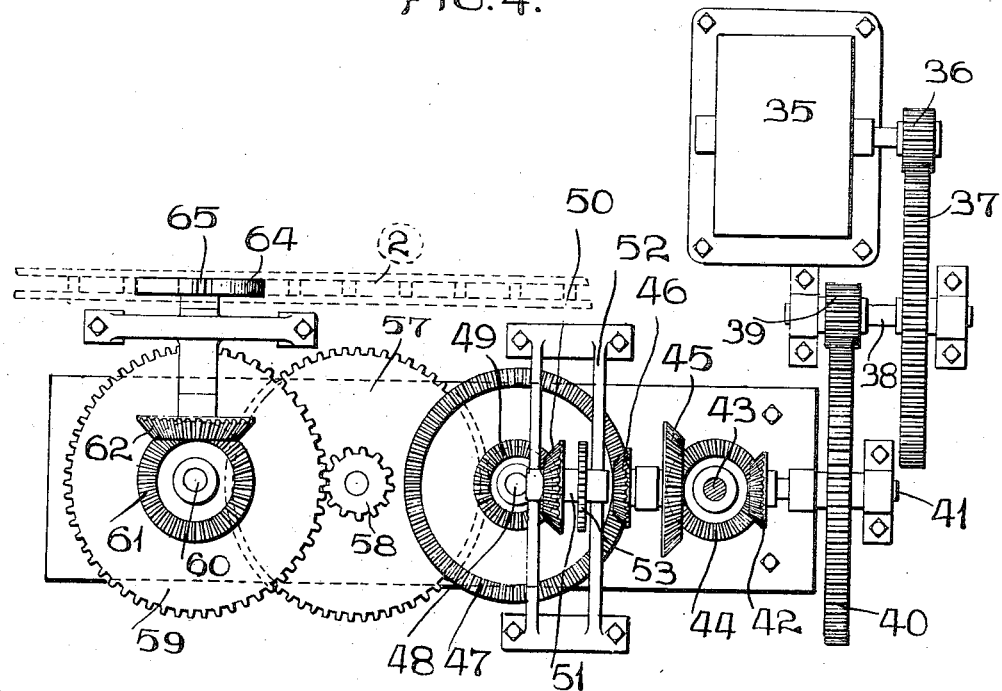
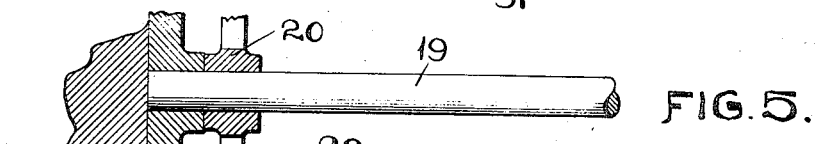
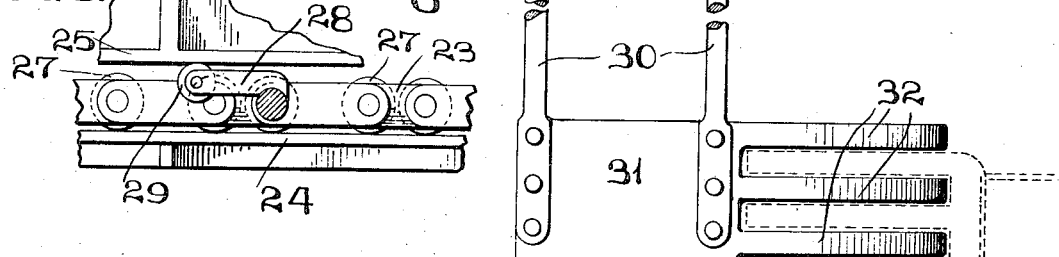
ATTEST.
H. J. Fletcher
M. P. Smith
INVENTOR.
THOMAS C. MOORSHEAD.
BY Higdon & Longan
ATTY'S.

No. 861,383. PATENTED JULY 30, 1907.
T. C. MOORSHEAD.
BOTTLE CARRYING AND DISTRIBUTING APPARATUS FOR GLASS HOUSE LEERS.
APPLICATION FILED DEC. 4, 1906.
4 SHEETS—SHEET 4.
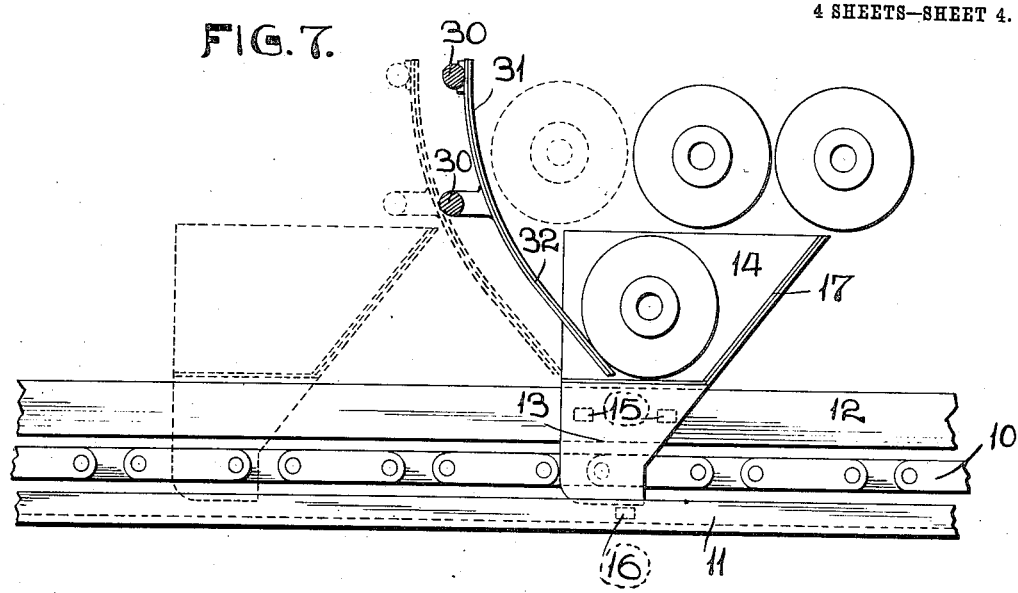
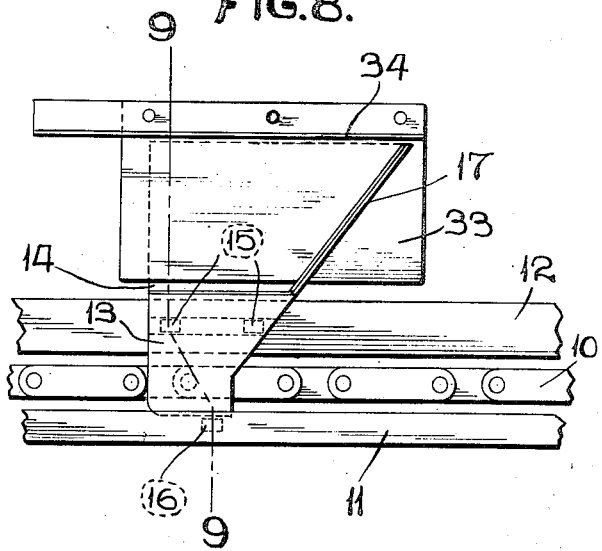
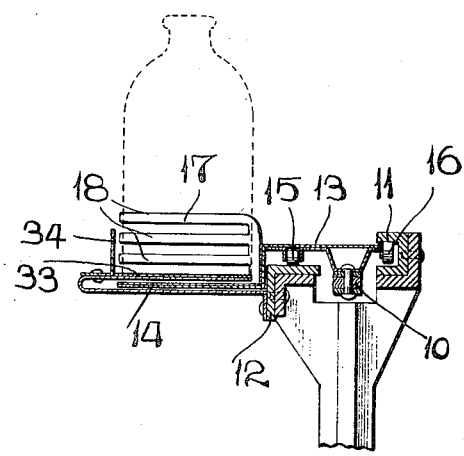
ATTEST.
H. J. Fletcher
M. P. Smith
INVENTOR.
THOMAS C. MOORSHEAD.
BY Higdon & Longan
ATT'YS

UNITED STATES PATENT OFFICE.

THOMAS C. MOORSHEAD, OF ALTON, ILLINOIS.

BOTTLE CARRYING AND DISTRIBUTING APPARATUS FOR GLASS-HOUSE LEERS.

No. 861,383.   Specification of Letters Patent.   Patented July 30, 1907.

Application filed December 4, 1906. Serial No. 346,347.

*To all whom it may concern:*

Be it known that I, THOMAS C. MOORSHEAD, a citizen of the United States, and a resident of Alton, Madison county, Illinois, have invented certain new and useful Improvements in Bottle Carrying and Distributing Apparatus for Glass-House Leers, of which the following is a specification containing a full, clear, and exact description, reference being had to the accompanying drawings, forming a part hereof.
My invention relates to a bottle carrying and distributing apparatus for glasshouse leers, and the object of my invention is to provide a simple and easily operated mechanism whereby bottles and similar blown glassware may be conveyed from the finishers or glass blowing machines to the leer, and distributed therein upon the leer conveyer.

It is essential that the bottles or like glassware after being blown be quickly delivered to the leer, in order to avoid their becoming cooled to such a degree as to endanger breakage; and it has therefore been the practice to have operators transfer the bottles from the conveyers or blowing machines to the leers, which practice consumes considerable time and expense on account of the number of employees required.
My improved apparatus consists of a bottle conveyer on which the bottles are deposited as fast as they are blown, and which conveyer quickly conveys them to the mouth of the leer, where they are delivered to and distributed upon the leer conveyer by a transfer mechanism operating in connection with the first mentioned conveyer.

To the above purposes, my invention further consists in certain novel features of construction and arrangement of parts, which will be hereinafter more fully set forth, pointed out in the claims, and illustrated in the accompanying drawings, in which:—

Figure 1 is a vertical section taken through the center of the forward end of a leer, and showing my improved distributing apparatus arranged above the front end of the leer conveyer; Fig. 2 is a horizontal section taken approximately on the line 2—2 of Fig. 1; Fig. 3 is a vertical section taken approximately on the line 3—3 of Fig. 2, and showing the leer conveyer and a bottle distributing mechanism in elevation; Fig. 4 is a plan view of the driving mechanism for the bottle conveyer, the bottle distributing mechanism, and the leer conveyer; Fig. 5 is an enlarged detail section taken approximately on the line 5—5 of Fig. 3; Fig. 6 is a detail section taken on the line 6—6 of Fig. 5;
Fig. 7 is an enlarged horizontal section taken approximately on the line 7—7 of Fig. 3, and showing the mechanism utilized for transferring the bottles from the bottle carrier onto the leer conveyer; Fig. 8 is a plan view of a receiving plate on which the bottles are deposited immediately after they are blown, and from which they are removed by the bottle conveyer; Fig. 9 is a transverse section taken on the line 9—9 of Fig. 8.

Referring by numerals to the accompanying drawings:—1 designates the front wall of the leer, and operating therethrough is the usual leer conveyer 2, which passes around the sprocket wheels 3 carried by a shaft 4 arranged in front of the leer.

Located immediately in front of the leer and inclosing the projecting end of the leer conveyer is a suitable housing 5, provided with an upward extension 6; and formed in the side walls of said housing, immediately in front of the upper portion of the opening in the front wall 1 of the leer are horizontally alined openings 7, which accommodate the bottle conveyer as it passes across the front of the leer.

Mounted on opposite sides of the housing 5, in alinement with the lower portions of the opening 7, are standards 8, in which are journaled for rotation the horizontally arranged sprocket wheels 9, and passing around said wheels is a sprocket chain 10, which operates between the front of the leer and the point where the bottles are blown.

Fixed to the upper ends of the standards 8, on opposite sides of the chain 10, is a channel iron 11, and an angle iron 12; and fixed to the sprocket chain 10, at suitable distances apart, are plates 13, which are provided with triangular extensions 14 extending outwardly beyond the angle iron 12, and arranged on the under side of the plate 13, in any suitable manner, are rollers 15, which ride on top of the angle iron 12, and also a roller 16 which rides in the channel iron 11.

The rear edge of the plate 14, which is inclined, is provided with a vertically disposed flange 17, divided into fingers 18 by being horizontally slotted, and the top surface of said plate 14 and the inner surfaces of the fingers 18 are covered with a thin sheet of asbestos, which is for the purpose of preventing the bottles which are extremely hot from sticking to the carrying plates 14.

When the bottle carrier constructed as described is in operation, the chain 10, provided with the bottle carrying plates 14 passes around the sprocket wheels 9 and through the openings 7 in the housing 5, across the top of the leer conveyer, and the carrying plates 14 travel in a plane parallel with and just above the plates of the leer conveyer 2.

Journaled for rotation in the lower portion of the extension 6 of the housing and adjacent the sides thereof is a pair of shafts 19, each of which carries a pair of sprocket wheels 20, and journaled on trunnions 21, arranged immediately above the shafts 19, are corresponding sprocket wheels 22, and passing around each set of the sprocket wheels 20 and 22 are sprocket chains 23.

Formed integral with the inner faces of the front and rear walls of the extension 6 of the housing, and directly opposite one another, are the pairs of flanges 24 and 25, between which pass the sprocket chains 23 in their travel between the sprocket wheels 20; and connecting one chain 23 with the other, and arranged at suitable distances apart, are rods 26, the ends of which pass through corresponding links in the chains 23, and being provided with rollers 27 which ride upon the lowermost flanges 24.

Formed integral with each rod 26, adjacent its ends, are the laterally projecting arms 28, the outer ends of which carry rollers 29, which bear against the under sides of the flanges 25 during the time the ends of the rods 26 are traveling between the pairs of flanges 24 and 25.

Carried by each rod 26 is a pair of depending arms 30, to the lower end of which is fixed a vertically disposed curved plate 31, the right hand end of which is provided with a plurality of outwardly extending fingers 32, between which latter the fingers 18 of the bottle carrying plates pass when the carrying and transferring mechanism is in operation. The plates 31 and fingers 32 are lined with asbestos, or analogous material, and are curved in opposition to the inclination of the fingers 18 of the bottle carrying plates, so that during the operation of the mechanism, the outer ends of the fingers 32 pass between the rear ends of the fingers 18, and the bottles carried upon the plates 14 are forced outwardly off from said plates and are guided by the curved fingers 32 onto the leer conveyer.

Fixed on the outer edge of the angle iron 12, adjacent each bottle finisher or blowing machine, (not shown,) is a rectangular bottle receiving plate 33, which occupies a horizontal plane just above the path of the travel of the bottle carrying plates 14, and in such a position as to pass through the opening in the flange 17 below the lowermost finger 18. Fixed on the outer edge of each plate 33 is a vertically disposed flange 34, against which the side of the bottle bears while the same is being removed from the plate 33.

The driving mechanism for the carrying and distributing apparatus is arranged in the lower portion of the housing 5, and comprises a variable speed motor 35, a pinion 36, mounted on the motor shaft, a gear wheel 37 driven by the pinion 36, shaft 38 carrying the gear wheel 37, pinion 39 mounted on shaft 38, gear wheel 40 meshing with pinion 39, shaft 41 carrying gear wheel 40, beveled pinion 42 fixed on the shaft 41, vertically disposed shaft 43 mounted in suitable bearings and which carries one of the sprocket wheels 9 on its upper end, beveled pinion 44 driven by the pinion 42, beveled pinion 45 driven by the pinion 44, beveled pinion 46 mounted on the same shaft as is the pinion 45, beveled gear wheel 47 driven by the pinion 46, vertically disposed shaft 48 carrying said gear wheel 47 and which carries a beveled pinion 49, beveled pinion 50 meshing with pinion 49, horizontally disposed shaft 51 carrying the pinion 50 and mounted in suitable bearings 52, sprocket wheel 53 fixed on shaft 51 and connected by a suitable sprocket chain 54 to a sprocket wheel 55 fixed on one of the shafts 19, pinion 56 fixed on the shaft 48, gear wheel 57 driven by the pinion 56, pinion 58 fixed on the shaft carrying the gear wheel 57, gear wheel 59 driven by the shaft 58, vertically disposed shaft 60 which carries the gear wheel 59, beveled pinion 61 fixed on the shaft 60, beveled pinion 62 driven by the pinion 61, horizontally disposed shaft 63 carrying the pinion 62, and mounted on said shaft 63 is a disk 64 provided with a single tooth 65, which meshes with the teeth of one of the leer conveyer chains. This driving mechanism provides means for operating the bottle conveyer and the bottle transferring or distributing mechanism at the proper speeds, and also imparts an intermittent motion to the leer conveyer; and, while this form of driving mechanism is preferable, it will be readily understood that various movable parts of the apparatus can be independently driven in any suitable manner.

The bottles being formed by the finisher, or the blowing machines, are positioned on the plates 14, and are rapidly carried thereby into the housing 5, as the bottle conveyer moves therethrough. The bottle transferring or distributing mechanism, comprising the chains 10 and parts carried thereby, moves very slowly compared to the bottle conveyer, and the bottle carrying plates 14 overtake and pass the plates 31 while the latter are moving a distance equal to the width of a bottle. The bottles positioned on the plate 14 engage with the curved fingers 32, and as the plate 14 continues its forward movement at a speed greater than the speed of said fingers 32, the sides of the bottle are engaged between the fingers 32 and 18, and are gradually forced outwardly off from the plate 14 onto the leer conveyer and into a position where the fingers 18 can pass to the rear of said bottle. When the curved plate 31 and fingers 32 have moved forwardly a distance equal to the thickness of a bottle, the next plate 14 overtakes said plate and fingers, and a second bottle is deposited on the leer conveyer. This operation continues during the entire travel of the plate 31 and fingers 32 across the leer conveyer, and when a row of bottles have thus been positioned upon said leer conveyer, the tooth 65 engages with the chain of said conveyer, moves the same rearwardly into the leer, and at this point a second plate 31 and fingers carried thereby start across the top of the leer conveyer to guide and assist in transferring the bottles from the bottle carrying plates 14 to the leer conveyer.

During the time the plates 31 are in service, the rollers 29 on the arms 28, carried by the rods 26, are traveling beneath the flanges 25, and bearing thereagainst in opposition to the strain due to the engagement of the bottles against the plates 31 and fingers 32.

Should it happen that the person placing the bottles on the bottle conveyer desires to deposit a bottle just after one of the plates 14 has passed, said bottle is deposited on the fixed plate 33, on which it remains until the next plate 14 passes beneath said plate 33; and in so doing, the fingers 18 will engage against the side of said bottle and carry the same along against the vertical flange 34, and finally remove the bottle from said plate 33.

A bottle carrying and distributing apparatus of my improved construction is comparatively simple, easily operated, and effects a considerable saving of time and labor and consequent expense in the production of bottles, and greatly lessens the percentage of broken bottles due to too long exposure to the atmosphere, immediately after being blown or formed.

I claim:—

1. The combination with a glasshouse leer and leer conveyer, of a bottle conveyer arranged to convey the bottles from the point where they are blown to the leer, and which conveyer passes transversely across the forward portion of the leer, a bottle transferring mechanism arranged above the forward portion of the leer conveyer and traveling parallel with the bottle conveyer, and means carried by the bottle transferring mechanism for successively engaging the bottles and depositing them onto the leer conveyer while the bottle conveyer and transferring mechanism are in operation.

2. The combination with a glasshouse leer and leer conveyer, of a bottle conveyer arranged to convey the bottles from the point where they are blown to the leer, which conveyer passes transversely across the forward portion of the leer conveyer, bottle receiving plates arranged on the bottle conveyer, an endless carrier transversely arranged above the forward portion of the leer conveyer and operating immediately over the bottle conveyer, and vertically disposed curved plates carried by said endless conveyer, which travel immediately over the bottle receiving plates of the bottle conveyer to remove the bottles therefrom.

3. The combination with a glasshouse leer and leer conveyer, of a bottle conveyer arranged to convey the bottles from the point where they are blown to the leer, which conveyer passes transversely across the forward portion of the leer conveyer, bottle receiving plates arranged on the bottle conveyer, an endless carrier transversely arranged above the forward portion of the leer conveyer and operating immediately over the bottle conveyer, vertically disposed curved plates carried by said endless conveyer, which travel immediately over the bottle receiving plates of the bottle conveyer to remove the bottles therefrom, and means whereby the bottle conveyer and endless conveyer are simultaneously operated.

4. The combination with a glasshouse leer and leer conveyer, of a bottle conveyer operating in front of the leer and across the top of the conveyer therein, means whereby said bottle conveyer is caused to continuously travel at a predetermined speed, a bottle transferring mechanism arranged for operation immediately above the leer conveyer and moving parallel with the bottle conveyer, and means whereby said bottle transferring mechanism is continuously moved at a slower rate of speed than the speed of the bottle conveyer.

5. The combination with a glasshouse leer and leer conveyer, of a bottle conveyer operating in front of the leer and across the top of the conveyer therein, means whereby said bottle conveyer is caused to continuously travel at a predetermined speed, a bottle transferring mechanism arranged for operation immediately above the leer conveyer and moving parallel with the bottle conveyer, means whereby said bottle transferring mechanism is continuously moved at a slower rate of speed than the speed of the bottle conveyer, and means whereby the leer conveyer is intermittently moved.

6. The combination with a glasshouse leer and leer conveyer, of a bottle conveyer operating in front of the leer and across the top of the conveyer therein, bottle receiving plates carried by the bottle conveyer, vertically disposed slotted plates integral with the rear sides of the bottle receiving plates, a bottle transferring mechanism arranged for operation above the bottle conveyer, vertically disposed plates carried by the bottle transferring mechanism, portions of which plates are slotted and adapted to pass through the slotted backs of the bottle receiving plates, and means whereby the bottle conveyer and bottle transferring mechanism are simultaneously operated at different speed.

7. The combination with a glasshouse leer and leer conveyer, of a bottle conveyer operating in front of the leer and across the top of the conveyer therein, means arranged immediately above the forward portion of the leer conveyer and operating parallel with the bottle conveyer for successively engaging the bottles delivered by the bottle conveyer and transferring said bottles to the leer conveyer, and means whereby the bottle conveyer and transferring mechanism are simultaneously and continuously moved.

In testimony whereof, I have signed my name to this specification, in presence of two subscribing witnesses.

THOMAS C. MOORSHEAD.

Witnesses:
 M. P. SMITH,
 E. M. HARRINGTON.